(12) United States Patent
Murata et al.

(10) Patent No.: US 7,201,889 B2
(45) Date of Patent: Apr. 10, 2007

(54) FUEL REFORMING METHOD AND SYSTEM

(75) Inventors: Keiji Murata, Kumano (JP); Kazuaki Nakagawa, Tokyo (JP); Yoshikazu Hagiwara, Tokyo (JP); Kazuya Yamada, Tokyo (JP); Mitsutoshi Hamamura, Yachiyo (JP); Yasuhito Sakakibara, Sakura (JP); Hidetsugu Fujii, Sakura (JP)

(73) Assignees: Kabushiki Kaisha Toshiba, Tokyo (JP); Toyo Engineering Corporation, Tokyo (JP)

( * ) Notice: Subject to any disclaimer, the term of this patent is extended or adjusted under 35 U.S.C. 154(b) by 133 days.

(21) Appl. No.: 10/349,997

(22) Filed: Jan. 24, 2003

(65) Prior Publication Data

US 2003/0150163 A1      Aug. 14, 2003

(30) Foreign Application Priority Data

Jan. 25, 2002    (JP)    ............................. 2002-016928

(51) Int. Cl.
   *C01B 3/26*   (2006.01)
   *B01J 8/04*   (2006.01)
   *B01J 10/00*   (2006.01)

(52) U.S. Cl. ...................... 423/651; 423/652; 422/191; 422/193

(58) Field of Classification Search .............. 48/62 R, 48/89, 119, 197 R, 198.3, 198.7; 252/373; 422/187–191, 193, 198, 211, 291; 423/651, 423/652

See application file for complete search history.

(56) References Cited

U.S. PATENT DOCUMENTS 6,387,845 B1 * 5/2002 Masahiro et al. ........... 502/407

2002/0085967 A1 * 7/2002 Yokota ....................... 422/198

FOREIGN PATENT DOCUMENTS

EP    1 018 485    7/2000

(Continued)

OTHER PUBLICATIONS

Vladimir M. Zamansky Advanced Gasification-Combustion Technology for Production of Hydrogen, Power and Swquestration-Ready $CO_2$: Unmixed Fuel Processor for Coal. GE Energy and Environmental Research Corporation (GE-EER). Sep. 3-4, 2002, pp. 1-30.

*Primary Examiner*—Colleen P. Cooke
(74) *Attorney, Agent, or Firm*—Oblon, Spivak, McClelland, Maier & Neustadt, P.C.

(57) ABSTRACT

A fuel reforming method includes the step of supplying carbon-containing fuel and steam to a reactor filled with a fuel reforming catalyst and a $CO_2$ absorbent and discharging $CO_2$, and setting the absorbent at an absorption temperature, thereby converting the carbon-containing fuel into reformed fuel, and separating $CO_2$ from the reformed fuel, the step of obtaining a product gas by oxidizing a portion of the reformed fuel and/or the carbon-containing fuel with an oxidizer, and heating the absorbent with this product gas to a regeneration temperature, thereby regenerating the absorbent and storing heat in this absorbent, and the step of supplying the carbon-containing fuel and steam to the reactor, thereby cooling, to the absorption temperature, the absorbent heated to the regeneration temperature, and converting the carbon-containing fuel into reformed fuel by heat energy stored in the $CO_2$ absorbent. An apparatus for the method is also disclosed.

10 Claims, 6 Drawing Sheets

FOREIGN PATENT DOCUMENTS

| | | |
|---|---|---|
| JP | 2000-143204 | 5/2000 |
| JP | 2001-58801 | 3/2001 |
| JP | 2002-255508 | 9/2002 |
| JP | 2004-530272 | 9/2004 |
| JP | 8-35625 | 2/2006 |
| WO | WO 02/08573 | 10/2002 |

* cited by examiner

| City gas composition (mol% based on dry gas) | Example 1 | Comparative example 1 | Comparative example 2 |
|---|---|---|---|
| Methane | 88.5 | 88.5 | 88.5 |
| Ethane | 4.6 | 4.6 | 4.6 |
| Propane | 5.4 | 5.4 | 5.4 |
| Butane | 1.5 | 1.5 | 1.5 |
| Steam | | | |
| Steam/carbon ratio | 3.0 | 3.0 | 3.0 |
| Desulfurizer exit composition (mol% based on wet gas) | Line 33 | Line 132 | Line 132 |
| Methane | 19.25 | 19.25 | 19.25 |
| Ethane | 1.00 | 1.00 | 1.00 |
| Propane | 1.17 | 1.17 | 1.17 |
| Butane | 0.32 | 0.32 | 0.32 |
| Steam | 78.25 | 78.25 | 78.25 |
| Cooling/fuel reforming step exit composition (mol% based on dry gas) | Line 34 | | |
| Carbon monoxide | 4.78 | | |
| Carbon dioxide | 9.85 | | |
| Hydrogen | 53.73 | | |
| Methane | 26.32 | | |
| Total of ethane, propane, and butane | 5.32 | | |
| Fuel reforming/carbon dioxide separation step exit or reactor exit (mol% based on dry gas) | Line 35 | Line 134 | Line 134 |
| Carbon monoxide | 1.31 | 5.65 | 16.23 |
| Carbon dioxide | 0.03 | 13.59 | 7.78 |
| Hydrogen | 78.81 | 65.59 | 75.81 |
| Methane | 10.28 | 15.17 | 0.18 |
| Nitrogen | 9.57 | | |
| Temperature | 600 | 600 | 850 |

FIG. 6

FUEL REFORMING METHOD AND SYSTEM

CROSS-REFERENCE TO RELATED APPLICATIONS

This application is based upon and claims the benefit of priority from the prior Japanese Patent Application No. 2002-016928, filed Jan. 25, 2002, the entire contents of which are incorporated herein by reference.

BACKGROUND OF THE INVENTION

1. Field of the Invention

The present invention relates to a method and system for manufacturing reformed hydrogen rich fuel by causing carbon-containing fuel to react with steam. This reformed fuel is preferably used as fuel for a boiler, gas turbine, gas engine, or fuel cell.

2. Description of the Related Art

In relation to the manufacture of reformed hydrogen rich fuel, a method and system using a steam reforming oven (heating type steam reforming oven) including a multi-tube reactor which causes a steam reforming reaction between carbon-containing fuel and steam are known. This method and system cause a partial oxidation reaction using a gas containing carbon-containing fuel and an appropriate amount of steam, and oxygen, oxygen rich air, or air.

The reaction temperature of a steam reforming reaction must be very high, from the viewpoint of chemical equilibrium of the reaction, in order to obtain a desired high conversion degree. In a conventional multi-tube reactor filled with a reforming catalyst, the tube wall and the flow of gas are parallel, so heat flow between the tube and catalyst and heat flow in the catalyst filling layer are not excellent. Therefore, the surface temperature of the tube wall must be held higher in order to maintain a necessary reaction temperature.

In addition, to improve the heat flow in the catalyst filling layer and lower the temperature of the tube wall, the tube diameter must be decreased to a certain degree. Also, since the steam reforming reaction is an endothermic reaction, a large quantity of heat must be transferred to a source gas at high temperatures. This requires a reaction tube made of a high-grade material having a large heat transfer area. So, these methods and systems are not economically advantageous.

On the other hand, U.S. Pat. No. 6,387,845 B1 discloses a carbon dioxide gas absorbent selected from the group consisting of lithium silicate, represented by formula $Li_xSi_yO_z$ (wherein x, y, and z are integers satisfying $x+4y-2z=0$). U.S. Pat. No. 6,387,845 B1 also discloses a method of separating and collecting carbon dioxide gas in an exhausted gas by using this absorbent.

Jpn. Pat. Appln. KOKAI Publication No. 10-152302 discloses a reactor which produces a predominant gas and a by-product gas of carbon dioxide by a chemical reaction of a source gas, and a chemical reaction apparatus which is installed in this reactor and contains a compound which produces a carbonate by reacting with carbon dioxide. Jpn. Pat. Appln. KOKAI Publication No. 10-152302 describes that the production rate of the predominant gas can be raised by efficiently removing carbon dioxide from the reaction field.

Unfortunately, in this technology described in Jpn. Pat. Appln. KOKAI Publication No. 10-152302, a quantity of heat required for the steam reforming reaction cannot be easily transmitted to a reforming catalyst, and increasing the size of the apparatus is difficult, from the economical viewpoint. Also, the steam reforming catalyst must be separated from a carbon dioxide absorbent via a porous partition and filled in each zone. This makes assembly and maintenance of the apparatus itself difficult.

It is thus an object of the present invention to provide a method and system capable of obtaining a desired high conversion degree at relatively low temperatures in a steam reforming reaction, capable of obtaining reformed fuel having high hydrogen purity, and capable of making an apparatus necessary for steam reforming inexpensive. It is another object of the present invention to obtain a carbon dioxide-containing gas having a high carbon dioxide content in addition to the reformed fuel.

BRIEF SUMMARY OF THE INVENTION

The present inventors conducted extensive research to achieve the above objects, and have found that the above objects can be achieved by using a fuel reforming catalyst and carbon dioxide absorbent at the same time.

That is, a desired high conversion degree can be obtained at relatively low temperatures by shifting the chemical equilibrium of a steam reforming reaction by simultaneously causing the reforming reaction and an absorption reaction of carbon dioxide produced by the steam reforming reaction.

Also, reformed fuel having high hydrogen purity can be obtained by exchanging heat in the same reactor by simultaneously causing a steam reforming reaction as an endothermic reaction and a carbon dioxide absorption reaction as an exothermic reaction.

Furthermore, a carbon dioxide-containing gas having a high carbon dioxide content can be obtained as a by-product from carbon dioxide discharged when an absorbent is regenerated.

On the basis of the above findings, the present inventors have completed the present invention.

That is, the present invention is a fuel reforming method of obtaining reformed hydrogen rich fuel from carbon-containing fuel and steam, which uses a reactor filled with a fuel reforming catalyst which promotes a fuel reforming reaction by which the carbon-containing fuel and steam react with each other to produce carbon dioxide and hydrogen, and a carbon dioxide absorbent capable of reversibly absorbing and discharging carbon dioxide, and which comprises the fuel reforming/carbon dioxide separation step, absorbent regeneration/heat storage step, and cooling/fuel reforming step shown below.

In the fuel reforming/carbon dioxide separation step, the carbon-containing fuel and steam are supplied to the reactor, and the carbon dioxide absorbent is set at an absorption temperature, thereby converting the carbon-containing fuel into reformed fuel, and separating carbon dioxide from the reformed fuel by allowing the carbon dioxide absorbent to absorb carbon dioxide.

In the absorbent regeneration/heat storage step, a product gas is obtained by oxidizing a portion of the reformed fuel and/or the carbon-containing fuel with an oxidizer, and, with this product gas, the carbon dioxide absorbent which has absorbed carbon dioxide is heated to a regeneration temperature, thereby regenerating the carbon dioxide absorbent and storing heat in this carbon dioxide absorbent.

In the cooling/fuel reforming step, the carbon-containing fuel and steam are supplied to the reactor in which the absorbent regeneration/heat storage step is completed, thereby cooling, to the absorption temperature, the carbon dioxide absorbent heated to the regeneration temperature, and converting the carbon-containing fuel into reformed fuel by heat energy stored in the carbon dioxide absorbent.

In this method, it is preferable to periodically perform the fuel reforming/carbon dioxide separation step, absorbent regeneration/heat storage step, and cooling/fuel reforming step in order by using a plurality of reactors, and shift the cycle of at least one reactor from the cycle of at least one of the remaining reactors.

The reactor is preferably filled with a heat storage material which stores heat energy of the product gas.

Carbon dioxide generated when the carbon dioxide absorbent is regenerated is preferably collected as a by-product.

The carbon dioxide absorbent is preferably a compound which produces a carbonate by reacting with carbon dioxide, and/or a mixture obtained by adding to the compound at least one carbonate selected from the group consisting of a carbonate of an alkaline metal and a carbonate of an alkaline earth metal.

The compound which produces a carbonate by reacting with carbon dioxide is preferably at least one lithium composite oxide selected from the group consisting of lithium zirconate, lithium ferrite, and lithium silicate.

The absorption temperature of the carbon dioxide absorbent is preferably 400° C. to 700° C.

The regeneration temperature of the carbon dioxide absorbent is preferably 700° C. to 900° C.

The present invention is also a fuel reforming system for obtaining reformed hydrogen rich fuel from carbon-containing fuel and steam, comprising a reactor filled with a fuel reforming catalyst which promotes a fuel reforming reaction by which the carbon-containing fuel and steam react with each other to produce carbon dioxide and hydrogen, and a carbon dioxide absorbent capable of reversibly absorbing and discharging carbon dioxide.

This system comprises material supply means for supplying the carbon-containing fuel and steam to the reactor.

The system also comprises heating means for obtaining a product gas by oxidizing a portion of the reformed fuel and/or the carbon-containing fuel with an oxidizer, and heating the carbon dioxide absorbent to a regeneration temperature with this product gas.

The system further comprises switching means for switching the material supply means and heating means to be used.

This system preferably comprises a plurality of reactors, and has the material supply means and heating means for each reactor, and the switching means for each pair of the material supply means and heating means.

The system preferably comprises switching timing control means which, of the switching means for the material supply means and heating means, shifting the switching timing of at least one switching means from the switching timing of at least one of the remaining switching means.

The reactor is preferably filled with a heat storage material which stores heat energy of the product gas.

Absorption heat generated when the carbon dioxide absorbent absorbs carbon dioxide in the reactor is preferably used as the reaction heat of the fuel reforming reaction.

It is also preferable to partially oxidize and/or oxidize a portion of the reformed fuel and/or the carbon-containing fuel with an oxidizer, and use the reaction heat of this oxidation reaction as the reaction heat of the fuel reforming reaction.

The system preferably comprises, in the reactor, means for blowing an oxidizer into the reformed fuel and/or the carbon-containing fuel, and partially oxidizing or oxidizing a portion of the reformed fuel and/or the carbon-containing fuel.

The system preferably comprises recycling means for recycling carbon dioxide discharged from the carbon dioxide absorbent to a reactor containing the carbon dioxide absorbent which has discharged the carbon dioxide.

The heating means preferably heats the carbon dioxide absorbent by a gas mixture of the product gas and the recycled carbon dioxide.

The oxidizer is preferably oxygen, oxygen rich air, or air.

The carbon dioxide absorbent is preferably a compound which produces a carbonate by reacting with carbon dioxide, and/or a mixture obtained by adding to the compound at least one carbonate selected from the group consisting of a carbonate of an alkaline metal and a carbonate of an alkaline earth metal.

The compound which produces a carbonate by reacting with carbon dioxide is preferably at least one lithium composite oxide selected from the group consisting of lithium zirconate, lithium ferrite, and lithium silicate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the generation description given above and the detailed description of the preferred embodiments given below, serve to explain the principles of the invention.

FIG. 6 is a view showing the gas composition, temperature, and the like in each part of the fuel reforming system.

DETAILED DESCRIPTION OF THE INVENTION

Figure 1:
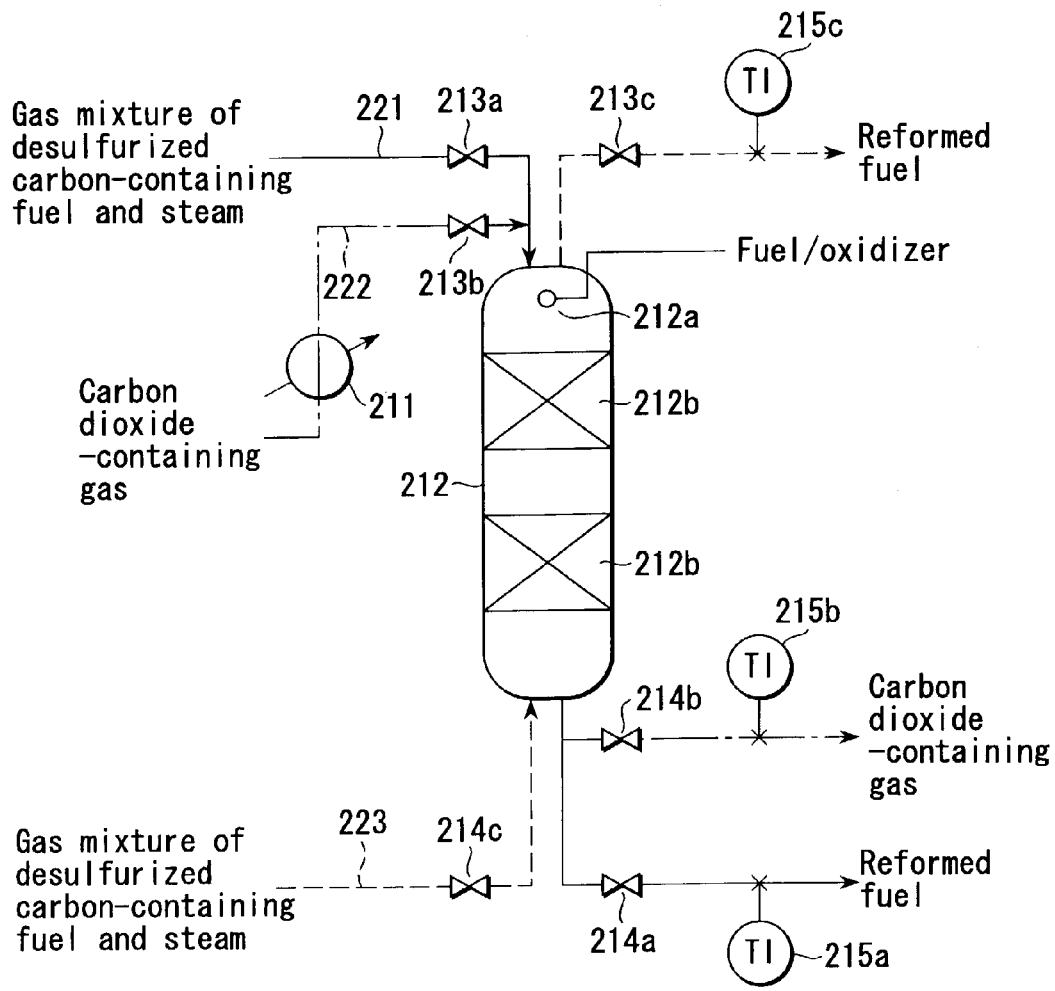
FIG. 1 is a view showing an example of a system to which a fuel reforming method according to the first embodiment of the present invention is applied.

A reactor used in the present invention is filled with a fuel reforming catalyst, a carbon dioxide absorbent, and, if necessary, a heat storage material for reducing the thermal stress and adjusting the heat balance of the apparatus. The shape and arrangement of the fuel reforming catalyst, carbon dioxide absorbent, and heat storage material need only be so determined that heat stored in the carbon dioxide absorbent and heat storage material and absorption heat in the carbon dioxide absorbent can be supplied to a reforming reaction which progresses in the fuel reforming catalyst, and that carbon dioxide produced by this fuel reforming reaction can reach the carbon dioxide absorbent and can be absorbed by the absorbent. For example, all the fuel reforming catalyst, carbon dioxide absorbent, and heat storage material can be formed into grains, and a filling layer can be formed by mixing these grains and filling them such that they are in direct contact with each other.

It is also possible to mix material powders of the individual fillers, mold the mixture into the shape of a sphere, cylinder, ring, punched wheel, honey comb, or corrugated panel, and form a filling layer by filling this molded product. To achieve the best effects of the present invention, these fillers are preferably arranged and filled so as not to interfere with heat flow, such that the flow of a gas passing through the filling layer is not interfered with and that the gas evenly disperses in the fillers, i.e., such that the movement of the materials is not interfered with and the reforming catalyst, carbon dioxide absorbent, and heat storage material are in direct contact with each other. The shape and arrangement of these materials can be freely chosen by taking account of the economical efficiency and the ease of maintenance and inspection.

In the present invention, an absorption temperature means a temperature at which the carbon dioxide absorbent can absorb carbon dioxide and a fuel reforming reaction can occur. This absorption temperature is preferably 400° C. or more from the viewpoint of the degree of progress of the fuel reforming reaction and the hydrogen concentration in the reformed fuel, and 700° C. or less from the viewpoint of the carbon dioxide absorption rate.

A regeneration temperature means a temperature at which the carbon dioxide absorbent can discharge carbon dioxide. This regeneration temperature is preferably 700° C. or more from the viewpoint of the carbon dioxide discharge rate. The regeneration temperature is also preferably 900° C. or less from the viewpoint of the service lives of the apparatus and materials, since the apparatus such as the reactor and the fillers such as the carbon dioxide absorbent deteriorate over time owing to repetitive periodic temperature changes.

In the present invention, the absorption temperature and regeneration temperature are periodically repeated (temperature swing), so the designed temperature of the reactor itself is dominated by the higher regeneration temperature. However, the filling layer has the above-mentioned characteristic feature that the material and heat can simultaneously flow only by randomly filling the reforming catalyst and carbon dioxide absorbent. When this feature is taken into consideration, in the radial direction perpendicular to the direction of a gas flow, there is no radial direction length (tube diameter) limitation described in the explanation of the conventional multi-tube reactor, i.e., the size (reactor diameter) in the radial direction can be freely determined. In the conventional multi-tube reactor, externally input heat flows to the filling layer through the tube wall. Accordingly, a high-grade material is necessary as the tube material.

In the present invention, however, no external heat flow occurs, so a structure from which internal heat does not escape to the outside is favored. The inner wall of the reactor can be lined with refractory bricks, and the fillers can be filled in this reactor. Since a general-purpose structural member (a material having a low heat-resistant temperature) can be used as the outer wall of the reactor, an extremely economical apparatus can be obtained.

The carbon-containing fuel can be any fuel containing carbon. Examples are a gas containing methane, ethane, or propane, lower alcohols, and lower ethers. Practical examples are a natural gas, city gas, LPG, naphtha, methyl alcohol, and dimethyl ether used as fuels in industries and the like.

The absorbing power of the carbon dioxide absorbent significantly lowers in the presence of sulfur components such as hydrogen sulfide and sulfur dioxide. Therefore, it is favorable to use carbon-containing fuel from which sulfur components are removed, or desulfurize the carbon-containing fuel in the system.

A practical material of the heat storage material is selected in terms of the stability, specific heat, thermal conductivity, true density, and bulk density at a temperature and in an atmosphere at and in which the reforming reaction pertaining to the present invention progresses and carbon dioxide is absorbed and discharged, and in terms of economical efficiency. Preferred examples are magnesia, lithium aluminate, and zirconia.

FIRST EMBODIMENT

Figure 2:
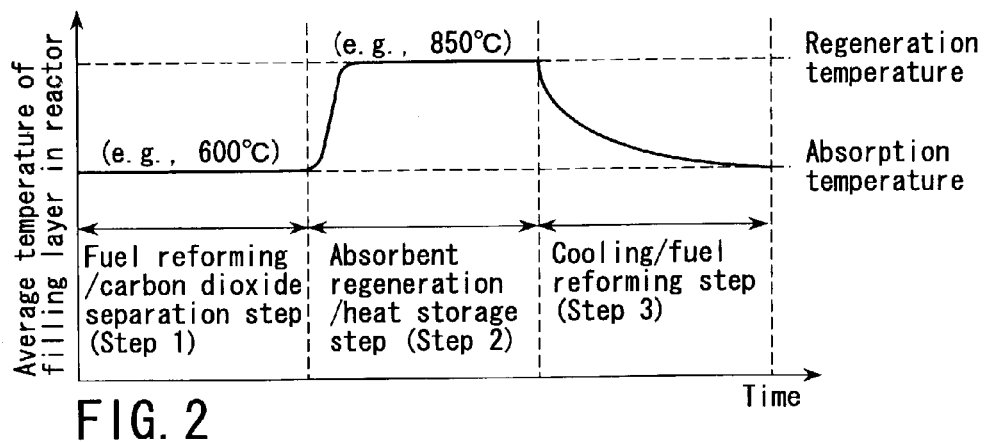
FIG. 2 is a timing chart showing an example of a method of operating the system to which a fuel reforming method according to the first embodiment of the present invention is applied.

The first embodiment of the present invention will be described below with reference to FIG. 1. FIG. 1 shows a form using one reactor. The operation is an intermittent operation which is periodically repeated in accordance with a typical timing chart shown in FIG. 2. Referring to FIG. 1, the solid lines indicate lines used in a fuel reforming/carbon dioxide separation step, the alternate long and short dashed lines indicate lines used in an absorbent regeneration/heat storage step, and the broken lines indicate lines used in a cooling/fuel reforming step. FIG. 2 shows the operation of one cycle by plotting the elapsed time on the abscissa, and the average temperature of a filling layer in the reactor on the ordinate.

Figure 3:
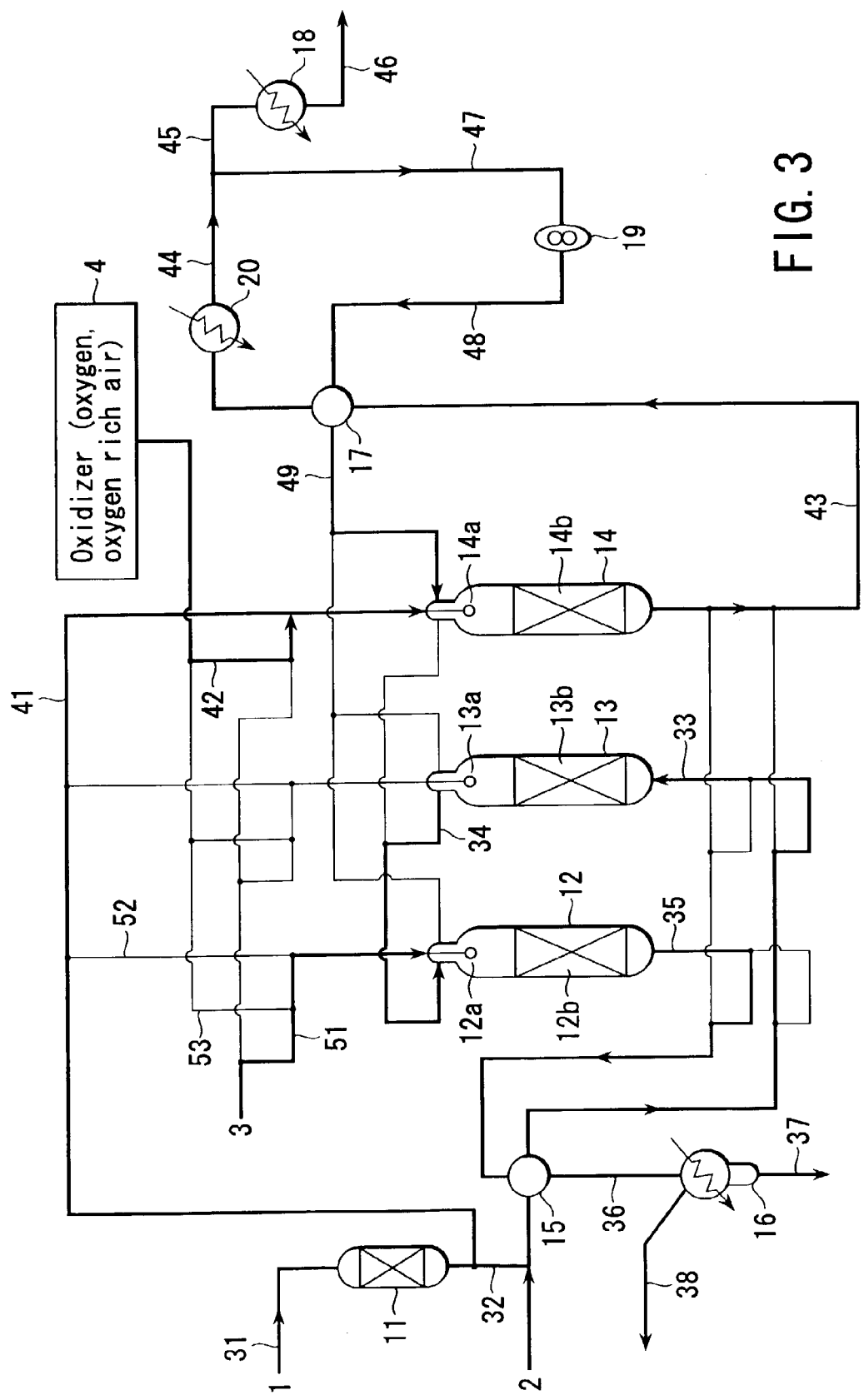
FIG. 3 is a process flow chart showing an example of a system to which a fuel reforming method according to the second embodiment of the present invention is applied.
Figure 5:
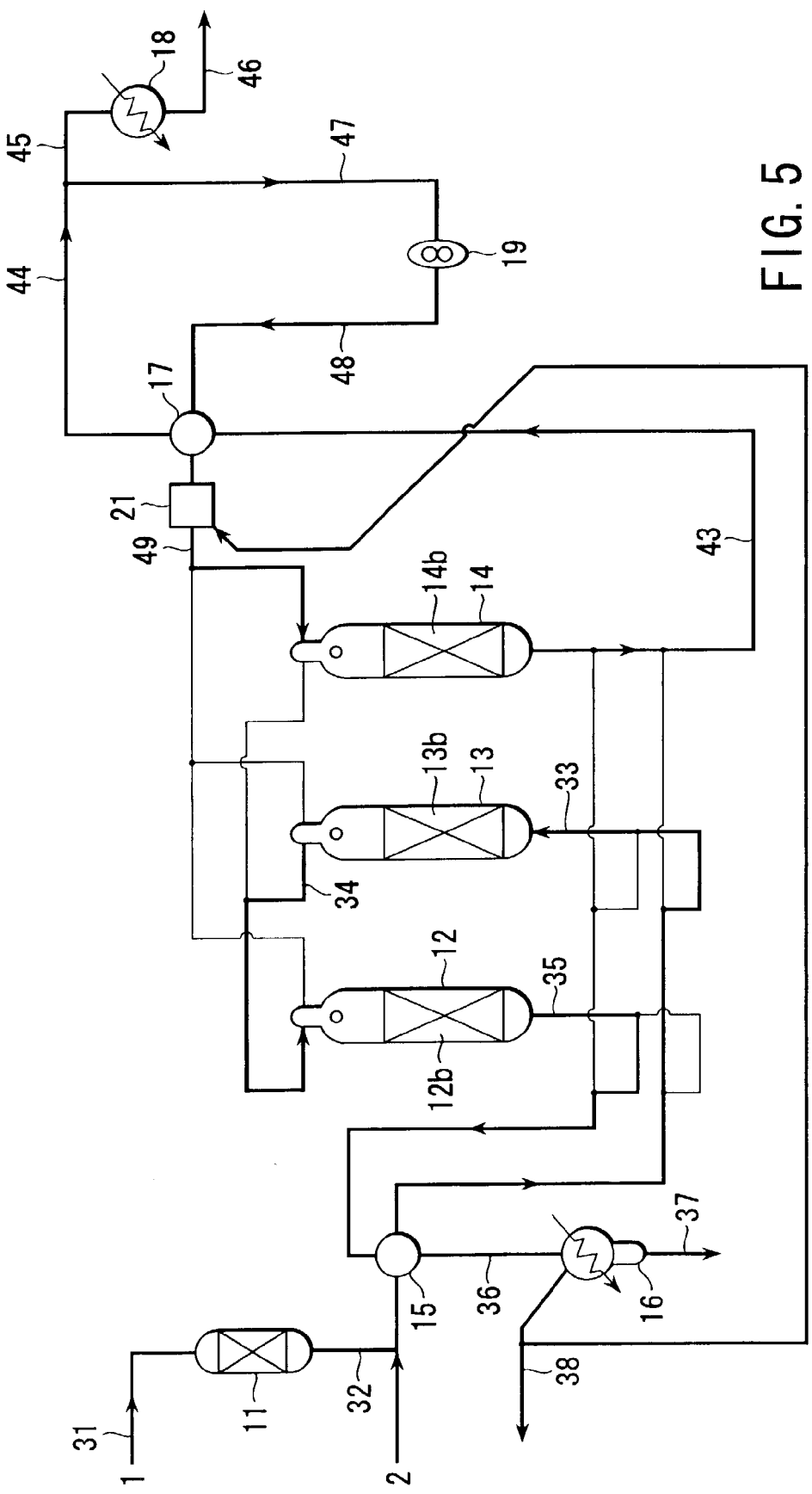
FIG. 5 is a view showing an example of a system to which a fuel reforming method according to the third embodiment of the present invention is applied.

As will be described later, other embodiments by which reformed fuel is continuously obtained are shown in FIGS. 3 and 5, and these embodiments will be described in detail later. Therefore, FIG. 1 will be. briefly explained below.

In this embodiment, one reactor 212 is filled with a fuel reforming catalyst, carbon dioxide absorbent, and, if necessary, heat storage material, thereby forming a filling layer 212b. The shape and arrangement of these fillers are already described above. For the sake of the convenience of explanation, the order of one cycle is a fuel reforming/carbon dioxide separation step (to be referred to as step 1 hereinafter), absorbent regeneration/heat storage step (to be referred to as step 2 hereinafter), and cooling/fuel reforming step (to be referred to as step 3 hereinafter).

Step 1 starts from a state in which the average temperature of the filling layer 212b is lowered to an absorption temperature which is a temperature at the end of step 3 in the last cycle. Although not shown in FIG. 1, a gas mixture (to be sometimes referred to as a source gas hereinafter) formed by mixing desulfurized carbon-containing fuel and steam and heated to a predetermined temperature is supplied to the reactor 212 through a line 221 and selector valve 213a. Selector valves 213b and 213c are kept closed. When passing through the filling layer 212b, the source gas comes in contact with the reforming catalyst and carbon dioxide absorbent. Therefore, this source gas flows toward the exit (lower portion) of the reactor 212 while causing a fuel reforming reaction and carbon dioxide absorption reaction. As will be described later, the reforming reaction is endothermic, and the carbon dioxide absorption reaction is exothermic. However, when these reactions simultaneously occur, the result is weakly endothermic.

Accordingly, the reaction temperature lowers toward the exit in the heat-insulated reactor 212 having no heating source. The temperature of the reaction gas flowing from the exit through a selector valve 214a is monitored by a thermometer 215a. An oxidizer and fuel (a portion of the reformed fuel and/or the carbon-containing fuel) are supplied to the upper portion of the reactor 212, and the fuel is oxidized by a burner 212a. Consequently, the average temperature of the reactor filling layer can be maintained substantially constant by using the generated oxidation reaction heat as a heating source.

The completion time of step 1 can be checked from the elapsed time by forming a breakthrough curve in advance from the average temperature of the filling layer 212b and the amount of filled carbon dioxide absorbent. The completion time of step 1 can also be known by analyzing the composition of the reformed fuel gas at the exit of the reactor 212 by using an analyzer, thereby checking the concentration of carbon dioxide which breaks through without being absorbed. After step 1 is complete, step 2 begins.

At the beginning of step 2, the reformed fuel gas remaining in the reactor 212 is exhausted outside the system, and the average temperature of the filling layer 212b is raised to a regeneration temperature required to regenerate the carbon dioxide absorbent.

When carbon dioxide absorbed by the absorbent is to be collected as a high-purity carbon dioxide gas, the carbon dioxide gas is desirably circulated. Although not shown in FIG. 1, in step 2, a gas holder which stores a necessary amount of carbon dioxide gas discharged from the absorbent supplies a carbon dioxide-containing gas to the reactor 212 through a line 222 and the selector valve 213b. This carbon dioxide-containing gas can be heated to the predetermined regeneration temperature by an external heater 211. Alternatively, the carbon dioxide-containing gas can be heated to the regeneration temperature, without using the heater 211, by supplying an oxidizer and fuel, oxidizing the fuel by the burner 212a, and using the generated oxidation reaction heat as a heating source, as in step 1.

The carbon dioxide-containing gas supplied from the upper portion of the reactor 212 and heated flows and comes in direct contact with the filler (including the fuel reforming catalyst, carbon dioxide absorbent, and, if necessary, heat storage material) at the absorption temperature at the end of step 1, thereby causing heat flow and heating the filler.

When the regeneration temperature is reached, the carbon dioxide absorbent which has absorbed carbon dioxide discharges carbon dioxide gas. The discharged carbon dioxide gas is supplied to the reactor 212 and mixed with the carbon dioxide-containing gas in this reactor 212, thereby forming a carbon dioxide-containing gas. This carbon dioxide-containing gas is exhausted from the exit (lower portion) of the reactor 212 through the selector valve 214b. In the filling layer 212b of the reactor 212, the boundary between the regeneration temperature and absorption temperature moves with time in the direction of flow.

The discharge of the carbon dioxide gas from the carbon dioxide absorbent is an endothermic reaction, so the temperature lowers along the flow direction. When the heat storage material is also contained, the temperature lowers in the flow direction in order to supply sensible heat from the heat storage material itself. Consequently, a temperature necessary for regeneration cannot be maintained any longer.

In the present invention, to maintain the regeneration temperature and supply necessary amounts of the discharge heat of the carbon dioxide gas and the sensible heat of the filler, heating by the external heater 211 or the oxidation reaction heat by the burner 212a is used. Also, to reuse the discharged carbon dioxide gas by raising its purity, it is preferable to use heating by the external heater 211. When the burner 212a of the reactor 212 is to be used, high-purity oxygen gas is preferably used as an oxidizer.

It is most favorable to use a heating source using the burner 212a which is also used in step 1. This is so because this heating method is economically excellent since no other heater is necessary, unlike the heating method using the external heater 211. The external heater 211 is also disadvantageous in that a relatively high-grade member is used as the structural member because the heater itself is exposed to high temperatures.

Although not shown in FIG. 1, the carbon dioxide-containing gas exhausted from the exit of the reactor 212 can also be pressurized and circulated.

The end of step 2 can be checked by detecting the boundary between the regeneration temperature and absorption temperature by monitoring the gas temperature at the exit of the reactor 212 by a thermometer 215b. Also, the necessary time of step 2 can be changed by controlling the flow rate of the carbon dioxide-containing gas supplied (or circulated) to the reactor 212.

Step 3 is started by exhausting the carbon dioxide-containing gas remaining in the reactor 212 to the outside of the system, and supplying the gas mixture (source gas) of the carbon-containing fuel and steam, described in step 1, from the lower portion of the reactor 212 through a selector valve 214c. Immediately after the start of step 3, the filling layer 212b in the reactor 212 is held at the regeneration temperature, and the source gas causes a reforming reaction with the reforming catalyst. However, carbon dioxide produced by this reforming reaction is not absorbed by the carbon dioxide absorbent, and the filling layer 212b causes only a reforming reaction, so the carbon dioxide directly passes through.

When the reforming reaction occurs, the resultant endothermic reaction gradually lowers the temperature of the filling layer 212b to the absorption temperature at which carbon dioxide is beginning to be absorbed by the absorbent. Accordingly, the boundary temperature (e.g., 700° C.) at which carbon dioxide is absorbed and discharged moves over time along the flow direction of the source gas in the filling layer 212b.

The reforming reaction and the carbon dioxide absorption reaction simultaneously occur upstream of the plane of flow of this boundary temperature, and only the reforming reaction occurs on the downstream side. The flow velocity of the boundary temperature depends on the sensible heat stored in the filler (the reforming catalyst, carbon dioxide absorbent, and, if necessary, heat storage material). That is, the larger the stored heat amount, the lower the flow velocity; the smaller the stored heat amount, the higher the flow velocity. Therefore, the necessary time of step 3 depends upon the amount of filler.

In step 3, heating by the burner 212a used in steps 1 and 2 described previously need not always be performed, and the reaction can be performed while heat is insulated. Step 3 is complete when that absorption temperature level of the filling layer 212b, which is required in step 1 to be subsequently performed is reached. Whether this temperature is reached can be checked by monitoring the temperature of the reformed fuel gas at the exit of the reactor 212 by a thermometer 215c.

In this embodiment, the source gas is allowed to flow upward in step 3, but this source gas can also be supplied downward. However, the source gas is supplied downward in next step 1. Therefore, if cooling in step 3 is insufficient and a high-temperature zone remains in the upper portion of the filling layer 212b, the source gas is supplied to this high-temperature zone in step 1. This may make absorption of carbon dioxide impossible. Hence, the source gas is desirably allowed to flow in a direction opposite to the flow direction in step 1.

Referring to FIG. 1, the gas flow direction in the reactor 212 is downward in steps 1 and 2 and upward in step 3. However, FIG. 1 merely shows the most desired flow directions. Therefore, the flow directions can be freely chosen in the present invention.

Between the individual steps, it is preferable to purge the reactor 212 by exhausting the gas of the preceding step remaining in the reactor 212. However, depending on the composition and properties of this residual gas, the gas can also be mixed in the reformed fuel or, although not shown in FIG. 1, processed in an exhaust gas processing apparatus. That is, the residual gas can be properly effectively used.

In the first embodiment described above, steps 1 to 3 are periodically repeated in order, so it is impossible to continuously extract the reformed fuel or continuously extract the absorbed and discharged carbon dioxide gas. However, this fuel and gas can also be continuously extracted by using, e.g., a plurality of reactors.

SECOND EMBODIMENT

Three reactors having the same shape and size are assigned to steps 1, 2, and 3. Times required to complete these steps can be made equal by controlling the filling amounts of carbon dioxide absorbent, the supply (circulation) amounts of carbon dioxide-containing gas, and, in some cases, the filling amounts of heat storage material.

This second embodiment will be described below with reference to FIG. 3. Referring to FIG. 3, the thick lines indicate lines currently being used, and the thin lines indicate lines not currently being used.

The second embodiment uses three reactors 12, 13, and 14. These reactors 12, 13, and 14 are filled with a fuel reforming catalyst, carbon dioxide absorbent, and, if necessary, heat storage material. These reactors 12, 13, and 14 are periodically and repeatedly operated in order in three steps. An example of a method of operating the system of this embodiment is shown in timing charts of FIGS. 4A, 4B, and 4C. In this method, the necessary times of the individual steps are made equal to each other, and the three reactors 12, 13, and 14 are periodically operated in order while the steps are shifted one at a time.

Carbon-containing fuel 1 is supplied to a desulfurizer 11 through a line 31, in order to remove sulfur components having significantly adverse effect on the catalytic activity of the fuel reforming catalyst and the absorbing power of the carbon dioxide absorbent. A filler to be filled in the desulfurizer 11 need only be, e.g., activated carbon having desulfurizing power, and a commercially available desulfurizing agent can be appropriately used. If a material does not require desulfurization, desulfurization can be omitted. It is also possible to mix reformed fuel obtained from a line 38 (to be described later) in the carbon-containing fuel 1, and supply the carbon-containing fuel 1 containing this reformed fuel from the line 31 to the desulfurizer 11.

The resultant carbon-containing fuel from which the sulfur components are removed is passed through a line 32 and mixed with predetermined steam 2 such that the steam/carbon (steam molar flow rate/carbon molar flow rate in carbon-containing fuel) ratio is preferably 1 to 5, thereby forming a gas mixture (to be sometimes referred to as a source gas hereinafter). This gas mixture is heated to a predetermined temperature, preferably 400 to 700° C., by a heat exchanger 15, and supplied to the reactor 13 in a cooling/fuel reforming step through a line 33.

[Cooling/Fuel Reforming Step]

The reactor 13 in the cooling/fuel reforming step is already subjected to an absorbent regeneration/heat storage step, and already heated to a temperature of preferably 700 to 900° C. before this step.

The source gas is supplied to this reactor 13 through the line 33. This supply is preferably performed from the lower portion of the reactor 13 for the reason explained below. After the cooling/fuel reforming step is complete, a fuel reforming/carbon dioxide separation step begins. If cooling of a filling layer 13b is insufficient, a high-temperature zone sometimes remains in the upper portion of this filling layer 13b. If the next fuel reforming/carbon dioxide separation step is started with this high-temperature zone remaining, no carbon dioxide absorption may occur in this high-temperature zone, and carbon dioxide produced by the reforming reaction may pass directly through the zone.

Accordingly, to reliably absorb carbon dioxide produced by the reforming reaction, the source gas is preferably supplied from that lower portion of the reactor 13, which is reliably cooled to the absorption temperature. This source gas supplied to the cooling/fuel reforming step from the lower portion through the line 33 flows upward while gradually causing a fuel reforming reaction from the lower portion of the reactor 13. As a consequence, cooling takes place from the lower portion, and the purpose is achieved. Although the source gas is preferably supplied from the lower portion, it can also be supplied from the upper portion.

The source gas causes a fuel reforming reaction with the carbon dioxide absorbent in this reactor 13 and with the quantity of heat stored in the heat storage material which is filled as needed. Consequently, the source gas is partially converted into reformed fuel. The carbon dioxide absorbent which is at a regeneration temperature in the cooling/fuel reforming step and which has discharged carbon dioxide is cooled by using the reaction heat of this reforming reaction. In some cases, the sensible heat of the heat storage material is used as the reaction heat of the reforming reaction.

In the cooling/fuel reforming step, the reforming reaction is performed while heat is insulated, and the gas temperature at the exit of the reactor 13 changes over time in accordance with the sensible heat amounts of these usable fillers. Accordingly, an absorption temperature at which the absorbent can absorb carbon dioxide need only be reached at the end of this cooling/fuel reforming step. So, the end time of this step can also be extended by adding the heat storage material. When no heat storage material is added, this step can be complete within the shortest time period. Whether to add the heat storage material can be properly determined by the cycle time (time required for one cycle) of each step and the source gas flow rate.

[Fuel Reforming/Carbon Dioxide Separation Step]

A source gas (to be sometimes referred to as a partially reformed source gas hereinafter) containing reformed fuel formed by partially converting the carbon-containing fuel into hydrogen is supplied to the fuel reforming/carbon dioxide separation step through a line 34. In the upper portion (upstream of the fuel reforming catalyst and carbon dioxide absorbent) of the reactor 12 in this fuel reforming/carbon dioxide separation step, a portion of the partially reformed source gas supplied from the line 34 and/or the carbon-containing fuel supplied from a line 52 is oxidized with air 3 supplied from a line 51, and supplied onto the fuel reforming catalyst. The air 3 from the line 51 is so supplied that the reaction heat generated by the oxidation matches the endotherm by the fuel reforming reaction at a desired fuel reforming reaction temperature and the exotherm when carbon dioxide is absorbed by the absorbent. This form is preferable because the carbon dioxide absorbent can be steadily set at the absorption temperature, and the fuel reforming reaction can be steadily and stably performed under this condition.

If no such oxidizing means is used, the sensible heat of the filler, the exotherm by absorption of carbon dioxide to the absorbent, and the endotherm by the reforming reaction are balanced. Accordingly, the average temperature of the filler in the reactor 12 lowers over time as a whole, so the fuel reforming reaction cannot be steadily and stably performed. However, reforming is possible if the temperature at the exit is equal to or higher than a temperature (e.g., 400° C.) necessary for the reforming. The only disadvantage is that the performance of the apparatus is inferior to that of the above form because, e.g., the concentration of an unconverted carbon-containing fuel increases and the hydrogen concentration decreases in the produced reformed fuel.

In the oxidation in the fuel reforming/carbon dioxide separation step, oxygen or oxygen-enriched air, instead of air, can be used as an oxidizer. Oxygen or oxygen rich air can be supplied from a line 53.

As the oxidizing means, it is possible to use a means which blows an oxidizer into the carbon-containing fuel and/or the reformed fuel and oxidizes or partially oxidizes a portion of the reformed fuel and/or the carbon-containing fuel. For example, burners 12a, 13a, and 14a are set in the upper portions of the reactors 12, 13, and 14, respectively, and partial oxidation or oxidation is performed in these portions. It is also possible to oxidize or partially oxidize a portion of the reformed fuel and/or the carbon-containing fuel outside the reactors 12, 13, and 14, and use the heat of the oxidation reaction. Furthermore, oxidizing or partial oxidizing means can be set both outside and inside the reactors 12, 13, and 14.

Partial oxidation is to oxidize and combust only a portion of the carbon-containing fuel and/or unreacted carbon-containing fuel in the reformed fuel, and obtain carbon monoxide as a product and hydrogen as a main reaction product (in a sense, incomplete combustion). The oxidation mentioned above is a general oxidation reaction which obtains carbon dioxide, water, hydrogen, and carbon monoxide as products. Partial oxidation increases the product hydrogen concentration by generating hydrogen in the product. Also, generated carbon monoxide is allowed to further react with steam (causes a shift reaction to be described later) and oxidized into carbon dioxide by the reforming catalyst. The resultant carbon dioxide is separated as it is absorbed by the absorbent.

In the reactor 12, a fuel reforming reaction occurs at a temperature of preferably 400° C. to 700° C. The supplied partially reformed source gas is converted into reformed fuel, and at the same time carbon dioxide is absorbed by the carbon dioxide absorbent. The reforming temperature is more preferably 500 to 600° C. The reforming temperature is preferably 400° C. or more from the viewpoint of the degree of progress of the fuel reforming reaction, and from the viewpoint of the obtained hydrogen concentration. A temperature of 700° C. or more is disadvantageous in economical efficiency, since the reaction amount of the reforming reaction does not increase in proportion to the rise of the temperature. Also, the carbon dioxide absorption rate and carbon dioxide discharge rate are substantially balanced. This makes a temperature of 700° C. or more disadvantageous in that substantial carbon dioxide absorption does not easily occur.

When carbon dioxide is absorbed, absorption heat corresponding to the absorption amount is generated, and this absorption heat is also used in the fuel reforming reaction. In addition, since carbon dioxide is absorbed by the carbon dioxide absorbent, an equilibrium reaction shown below shifts, and this further advances the reaction to accelerate the generation of hydrogen. Note that the fuel reforming reaction is a simultaneous reaction in which reactions indicated by reaction formulas 1 and 2 shown below occur at the same time. The reaction formulas and equilibrium formulas are as presented below. In each reaction formula, the carbon-containing fuel is represented by methane.

Steam reforming reaction formula:

$$CH_4+H_2O \Leftrightarrow CO+3H_2 \quad \text{(reaction formula 1)}$$

Shift reaction formula:

$$CO+H_2O \Leftrightarrow CO_2+H_2 \quad \text{(reaction formula 2)}$$

Steam reforming reaction equilibrium formula:

P($H_2$): hydrogen gas partial pressure
P(CO): carbon monoxide gas partial pressure
P($CH_4$): methane gas partial pressure
P($H_2O$): steam partial pressure Shift reaction equilibrium formula:

P($H_2$): hydrogen gas partial pressure
P($CO_2$): carbon dioxide gas partial pressure
P(CO): carbon monoxide gas partial pressure
P($H_2O$): steam partial pressure As a fuel reforming catalyst, a general-purpose nickel-based catalyst is favorable because it simultaneously causes the steam reforming reaction and shift reaction. However, it is also possible to use a catalyst mixture formed by properly mixing catalysts suited to the steam reforming reaction and shift reaction.

As the carbon dioxide absorbent, a compound which reacts with carbon dioxide and generates a carbonate at a temperature at which the fuel reforming reaction progresses is preferred. A lithium-based compound which can reversibly absorb and discharge carbon dioxide is economically favored. It is more favorable to use a lithium composite oxide, represented by lithium zirconate, lithium ferrite, or lithium silicate, which reacts with carbon dioxide and generates lithium carbonate. This is so because the decomposition temperature of lithium carbonate is low, and so a carbon dioxide absorbent which generates lithium carbonate by reacting with carbon dioxide can extract carbon dioxide at a temperature lower than when sodium carbonate, potassium carbonate, or calcium carbonate is generated.

Lithium zirconate is indicated by formula $Li_2ZrO_2$ or $Li_4ZrO_4$. Lithium ferrite is indicated by formula $LiFeO_2$. As lithium silicate, lithium metasilicate ($Li_2SiO_3$) and lithium orthosilicate ($Li_4iO_4$) are known. It is possible to particularly preferably use a reaction indicated by

$$Li_4SiO_4 + CO_2 = Li_2SiO_3 + Li_2CO_3 \qquad \text{(reaction formula 3)}$$

in which lithium orthosilicate absorbs carbon dioxide.

It is also possible to appropriately add an alkaline metal carbonate and/or alkaline earth metal carbonate, such as sodium carbonate, potassium carbonate, or calcium carbonate, to a compound such as a lithium composite oxide which reacts with carbon dioxide to generate a carbonate. In this case, the carbon dioxide absorption and discharge rates of the carbon dioxide absorbent depend upon the temperature and the type and concentration of added carbonate. The addition of the carbonate can accelerate the absorption and discharge reactions.

A hydrogen rich gas, i.e., reformed fuel is produced at a temperature of preferably 400° C. to 700° C. from the lower portion of the reactor 12 in the fuel reforming/carbon dioxide separation step. The produced reformed fuel is passed through a line 35 and cooled by heat exchange with the gas mixture of the carbon-containing fuel and steam. The cooled reformed fuel is supplied to a cooler 16 through a line 36 and further cooled, thereby separating and removing water in the reformed fuel to a line 37. After that, the reformed fuel is supplied as a product to the line 38. As described previously, a continuous operation can also be performed by mixing this reformed fuel with the carbon-containing fuel 1 and supplying this carbon-containing fuel containing the reformed fuel to the desulfurizer 11 through the line 31.

Referring to FIG. 3, a heat exchanger integrated with a separator which separates condensed water is used as the cooler 16. However, a cooler is not particularly limited, so any device can be selected in accordance with the purpose.

Also, the form of heat collection in this cooler 16 is not particularly restricted, so heat collection corresponding to the purpose can be performed. In particular, the reformed fuel contains uncondensed water, and the condensation heat of this uncondensed water can be effectively used. Various collection methods are possible. For example, the collected heat can be used as a heat source for generating the steam 2 shown in FIG. 3 and a heat source for preheating the carbon-containing fuel 1 and oxidizer 4. That is, heat collection corresponding to the purpose can be appropriately performed.

[Absorbent Regeneration/Heat Storage Step]

After the fuel reforming/carbon dioxide separation step is complete, the reactor proceeds to the absorbent regeneration/heat storage step. In this absorbent regeneration/heat storage step, fuel such as the carbon-containing fuel or reformed fuel is used as a heat source to regenerate the carbon dioxide absorbent, i.e., discharge carbon dioxide from the carbon dioxide absorbent at a regeneration temperature of preferably 700 to 900° C. The regeneration temperature is more preferably 800° C. to 850° C. A regeneration temperature of 700° C. or less is disadvantageous in that the absorption and discharge rates of carbon dioxide are substantially balanced, so substantial discharge does not easily occur. A regeneration temperature exceeding 900° C. is disadvantageous in deterioration of the apparatus, such as the reactor, and the filler, such as the carbon dioxide absorbent.

In this step, the carbon dioxide absorbent is heated to the regeneration temperature by a heating means. More specifically, the fuel is oxidized with an oxidizer by using oxidizing means, such as the burners 12a, 13a, and 14a set in the upper portions of the reactors 12, 13, and 14. The produced gas is brought into contact with the carbon dioxide absorbent, thereby regenerating the carbon dioxide absorbent and storing heat. The fuel is not restricted to the carbon-containing fuel but can be the reformed fuel, and some other fuel can also be used. That is, any fuel usable as a heat source can be used in regeneration of the carbon dioxide absorbent.

Although air can be used as the oxidizer, carbon dioxide and water can be obtained as the oxidation products by complete combustion (oxidation) by using oxygen or oxygen rich air. This makes it possible to obtain a carbon dioxide-containing gas having a high carbon dioxide concentration at the exit of the reactor and a low impurity concentration except for water. Water in this carbon dioxide-containing gas can be easily separated and removed from carbon dioxide as a main component merely by cooling, as will be described later. This further raises the carbon dioxide concentration in the carbon dioxide-containing gas after water is separated and removed. When high-purity oxygen is used as the oxidizer, a carbon dioxide-containing gas having a higher carbon dioxide concentration can be obtained. This carbon dioxide-containing gas can be sold as a value-added by-product. This makes the present invention a more economical fuel reforming method.

The oxidizing means such as the burners 12a, 13a, and 14a used as the heating means can also be used as the oxidizing means for use in the fuel reforming/carbon dioxide separation step. This further increases the economical efficiency.

Fuel as a heat source is supplied through a line 41 and mixed with the oxidizer 4 through a line 42, and the resultant mixture is supplied to the reactor 14 in the absorbent regeneration/heat storage step. The fuel is oxidized by the oxidizer in the reactor 14, so this reactor 14 is heated to a temperature of preferably 700 to 900° C. to regenerate the carbon dioxide absorbent. The fuel as a heat source is supplied only in an amount for maintaining the temperature necessary to regenerate the carbon dioxide absorbent and store heat. The produced gas (combusted gas) containing carbon dioxide discharged from the carbon dioxide absorbent is exhausted from the lower portion of the reactor 14, supplied to a heat exchanger 17 through a line 43 where heat is collected, and cooled by a cooler 20. The cooled gas containing the discharged carbon dioxide is branched into a carbon dioxide-containing gas as a by-product and a recycle gas through a line 44.

The carbon dioxide-containing gas as a by-product is cooled by a cooler 18 through a line 45, and supplied as a by-product through a line 46. The remaining recycle gas is used as a recycle gas in the absorbent regeneration/heat storage step. This recycle gas is supplied to the upper portion of the reactor 14 by a recycling means. That is, the recycle gas is supplied to a pressurizing means, in this embodiment a blower 19, through a line 47, pressurized to a pressure necessary for circulation by this blower 19, and then supplied to the heat exchanger 17 through a line 48. This heat exchanger 17 exchanges heat with the high-temperature, carbon dioxide-containing gas exhausted from the reactor exit. The resultant recycle gas is heated to a predetermined temperature through a line 49, supplied to the upper portion of the reactor 14, and used as a recycle gas in the absorbent regeneration/heat storage step.

When the temperature of the filling layer 14b rises to the regeneration temperature, the regeneration reaction of the carbon dioxide absorbent progresses to the left-hand side of reaction formula 3 presented earlier, so the absorbed carbon dioxide is discharged. However, the velocity of heat flow in the filling layer 14b can be increased by using convection heat transfer by circulating the same material as the gas absorbed by the absorbent. This raises the heat flow velocity and consequently shortens the time required for regeneration. Therefore, it is preferable to perform this carbon dioxide recycling. The recycled amount can be determined such that the temperature after heating by the oxidizing means is 900° C. or less, which has no influence on the carbon dioxide absorbent.

Carbon dioxide is cooled by the coolers 18 and 20. However, cooling means is not restricted to these coolers, and heat collection suited to the purpose can be performed. In particular, the carbon dioxide-containing gas exhausted from the reactor exit has a high temperature, so the sensible heat of this high temperature can be effectively used for various purposes. For example, the sensible heat can be used as a heat source for generating the steam 2 shown in FIG. 3, and a heat source for preheating the carbon-containing fuel 1 and oxidizer 4. That is, any effective method corresponding to the purpose can be appropriately used.

In this embodiment, a material introducing means is formed by, e.g., the lines (e.g., 33) from the carbon-containing fuel 1 and steam 2 to the reactor 13 and the devices (e.g., 11). The line 34 is also a material introducing means. The heating means is formed by setting the burners (12a, 13a, and 14a) upstream of the filling layers (12b, 13b, and 14b) filled with the carbon dioxide absorbent and the like in the reactors (12, 13, and 14). Although switching means for switching these means to be used are not shown in FIG. 3, these switching means can be formed by valves inserted into the lines. If these valves are automatic valves and a computer or the like is used to control these automatic valves, switching can be performed automatically. Also, a switching timing control means for switching these switching means at different timings can be formed by using automatic valves as these valves and using a computer or the like for controlling these automatic valves.

Figure 4A:
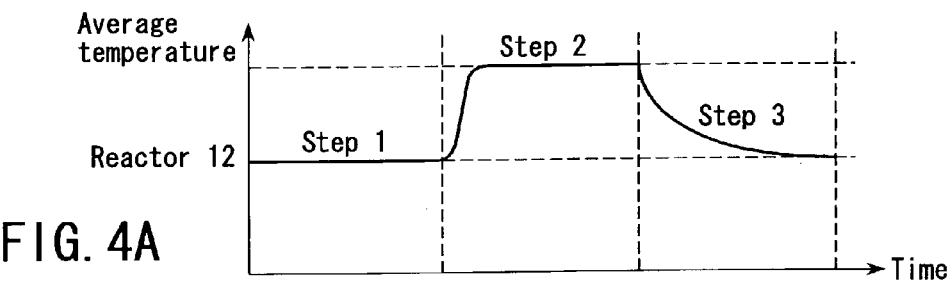
FIG. 4A is a timing chart showing an example of a method of operating the system to which the fuel reforming method according to the second embodiment of the present invention is applied (reactor 12)
Figure 4B:
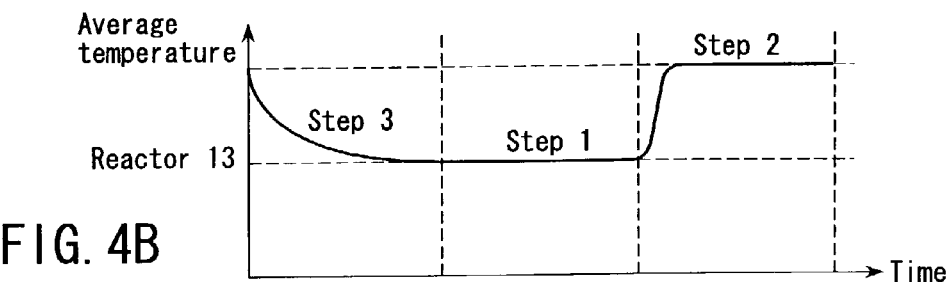
FIG. 4B is a timing chart showing the example of the method of operating the system to which the fuel reforming method according to the second embodiment of the present invention is applied (reactor 13)
Figure 4C:
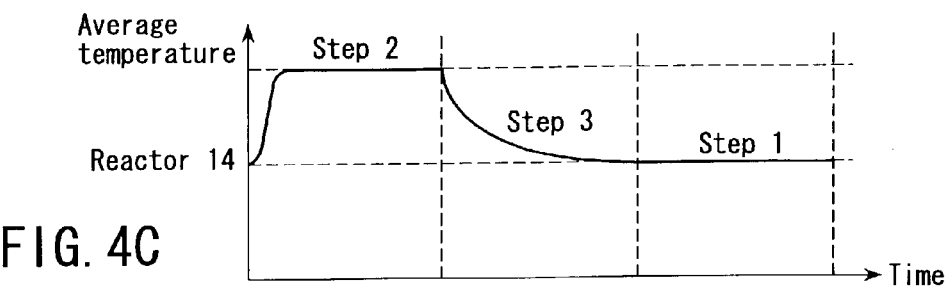
FIG. 4C is a timing chart showing the example of the method of operating the system to which the fuel reforming method according to the second embodiment of the present invention is applied (reactor 14)

FIGS. 4A, 4B, and 4C illustrate changes with time when the system shown in FIG. 3 is operated. A gas generated upon switching and remaining in each of the reactors 12, 13, and 14 can be exhausted to the outside of the system by appropriately purging the reactor as needed, or can be mixed in the reformed fuel as a product, or in the carbon dioxide-containing gas as a by-product. Although the product purity deteriorates in this case, the product can still be properly effectively used.

THIRD EMBODIMENT

The third embodiment will be described below with reference to FIG. 5. Referring to FIG. 5, the thick lines indicate lines currently being used, and the thin lines indicate lines not currently being used.

The process flow chart shown in FIG. 5 is obtained by partially changing the process flow chart shown in FIG. 3. That is, the lines 41, 42, 51, 52, and 53, burners 12a, 13a, and 14a, and cooler 20 are omitted from the process flow chart shown in FIG. 3, and a heater 21 is added. A method of operating the system of this embodiment is also explained by using the timing charts shown in FIGS. 4A, 4B, and 4C. Therefore, a description of the same portion as in FIG. 3 will be omitted, and only a fuel reforming/carbon dioxide separation step and absorbent regeneration/heat storage step as differences will be explained.

[Fuel Reforming/Carbon Dioxide Separation Step]

A source gas (to be sometimes referred to as a partially reformed source gas hereinafter) containing reformed fuel formed by partially converting a carbon-containing fuel into hydrogen is supplied to the fuel reforming/carbon dioxide separation step through a line 34. In the upper portion (upstream of a fuel reforming catalyst and carbon dioxide absorbent) of a reactor 12 in this fuel reforming/carbon dioxide separation step, a portion of the partially reformed source gas supplied from the line 34 is supplied onto the fuel reforming catalyst. High-temperature carbon dioxide from a line 49 is supplied as a heat source in accordance with the endotherm by a fuel reforming reaction at a desired fuel reforming reaction temperature and the exotherm when carbon dioxide is absorbed by the absorbent. This form is preferable because the carbon dioxide absorbent can be steadily set at an absorption temperature, and the fuel reforming reaction can be steadily and stably performed under this condition.

If no such oxidizing means is used, the sensible heat of a filler, the exotherm caused by absorption of carbon dioxide to the absorbent, and the endotherm caused by the reforming reaction are balanced. Accordingly, the average temperature of the filler in the reactor 12 lowers over time as a whole, so the fuel reforming reaction cannot be steadily and stably performed. However, reforming is possible if the temperature at the exit is equal to or higher than a temperature (e.g., 400° C.) necessary for the reforming. The only disadvantage is that the performance of the apparatus is inferior to that of the above form because, e.g., the concentration of an unconverted carbon-containing fuel increases, and the hydrogen concentration decreases in the produced reformed fuel.

In the reactor 12, a fuel reforming reaction occurs at a temperature of preferably 400° C. to 700° C. The supplied partially reformed source gas is converted into reformed fuel, and at the same time carbon dioxide is absorbed by the carbon dioxide absorbent. The reforming temperature is more preferably 500 to 600° C. The reforming temperature is preferably 400° C. or more from the viewpoint of the degree of progress of the fuel reforming reaction, and from the viewpoint of the obtained hydrogen concentration. A temperature of 700° C. or more is economically disadvantageous, since the reaction amount of the reforming reaction does not increase in proportion to the rise of the temperature, which is inefficient. Also, the carbon dioxide absorption rate and carbon dioxide discharge rate are substantially balanced. This makes a temperature of 700° C. or more disadvantageous in that substantial carbon dioxide absorption does not easily occur.

When carbon dioxide is absorbed, absorption heat corresponding to the absorption amount is generated, and this absorption heat is also used in the fuel reforming reaction. In addition, since carbon dioxide is absorbed by the carbon dioxide absorbent, an equilibrium reaction shifts, and this further advances the reaction to accelerate the generation of hydrogen. Note that the fuel reforming reaction is a simultaneous reaction in which reactions indicated by reaction formulas 1 and 2 described earlier occur at the same time. As in the second embodiment, in the reaction formulas and equilibrium formulas, the carbon-containing fuel is represented by methane.

As in the second embodiment, a general-purpose nickel-based catalyst is favorable as a fuel reforming catalyst because it simultaneously causes the steam reforming reaction and shift reaction. However, it is also possible to use a catalyst mixture formed by mixing catalysts suited to the steam reforming reaction and shift reaction.

As the carbon dioxide absorbent, as in the second embodiment, a compound which reacts with carbon dioxide and generates a carbonate at a temperature at which the fuel reforming reaction progresses is preferred. A lithium-based compound which can reversibly absorb and discharge carbon dioxide is economically favored. It is more favorable to use a lithium composite oxide, represented by lithium zirconate, lithium ferrite, or lithium silicate, which reacts with carbon dioxide and generates lithium carbonate.

As in the second embodiment, it is also possible to properly add an alkaline metal carbonate and/or alkaline earth metal carbonate, such as sodium carbonate, potassium carbonate, or calcium carbonate, to a compound such as a lithium composite oxide which reacts with carbon dioxide, to generate a carbonate.

A hydrogen rich gas, i.e., reformed fuel is produced at a temperature of preferably 400° C. to 700° C. from the lower portion of the reactor 12 in the fuel reforming/carbon dioxide separation step. The produced reformed fuel is passed through a line 35 and cooled by heat exchange with the gas mixture of the carbon-containing fuel and steam. The cooled reformed fuel is supplied to a cooler 16 through a line 36 and further cooled, thereby separating and removing water in the reformed fuel to a line 37. After that, the reformed fuel is supplied as a product to a line 38. As in the second embodiment, a continuous operation can also be performed by mixing this reformed fuel with a carbon-containing fuel 1 and supplying this carbon-containing fuel, containing the reformed fuel, to a desulfurizer 11 through a line 31.

Referring to FIG. 5, a heat exchanger integrated with a separator which separates condensed water is used as the cooler 16. However, a cooler is not particularly limited, so any device can be selected in accordance with the purpose.

Also, the form of heat collection in this cooler 16 is not particularly restricted, so heat collection corresponding to the purpose can be performed. In particular, the reformed fuel contains uncondensed water, and the condensation heat of this uncondensed water can be effectively used. Various collection methods are possible. For example, the collected heat can be used as a heat source for generating steam 2 shown in FIG. 5. That is, heat collection corresponding to the purpose can be appropriately performed.

[Absorbent Regeneration/Heat Storage Step]

After the fuel reforming/carbon dioxide separation step is complete, the reactor proceeds to the absorbent regeneration/heat storage step. In this absorbent regeneration/heat storage step, the reformed fuel 38 is used as a heat source to regenerate the carbon dioxide absorbent, i.e., discharge carbon dioxide from the carbon dioxide absorbent at a regeneration temperature of preferably 700 to 900° C. As in the second embodiment, the regeneration temperature is more preferably 800° C. to 850° C.

In this step, the carbon dioxide absorbent is heated to the regeneration temperature by a heating means. More specifically, a portion of the reformed fuel 38 is used as a heat source of the heater 21 to indirectly heat carbon dioxide in the line 49. The heated carbon dioxide is brought into contact with a carbon dioxide absorbent in a reactor 14, thereby heating and regenerating the carbon dioxide absorbent and storing heat in this absorbent.

The reactor 14 is heated to a temperature of preferably 700 to 900° C. to regenerate the carbon dioxide absorbent. Circulating carbon dioxide as a heat source is indirectly heated by the heater 21 by an amount for maintaining the temperature necessary to regenerate the carbon dioxide absorbent and store heat. Carbon dioxide discharged from the carbon dioxide absorbent is exhausted from the lower portion of the reactor 14, supplied to a heat exchanger 17 through a line 43 where heat is collected. The resultant carbon dioxide is branched into a carbon dioxide-containing gas as a by-product and circulating carbon dioxide (a recycle gas) through a line 44.

The carbon dioxide-containing gas as a by-product is cooled by a cooler 18 through a line 45, and supplied as a by-product through a line 46. The remaining recycle gas is used as a recycle gas in the absorbent regeneration/heat storage step. This recycle gas is supplied to the upper portion of the reactor 14 by a recycling means. That is, the recycle gas is supplied to a pressurizing means, in this embodiment a blower 19, through a line 47, pressurized to a pressure necessary for circulation by this blower 19, and then supplied to the heat exchanger 17 through a line 48. The heater 21 heats the gas in accordance with the endotherm caused by the fuel reforming reaction at a desired fuel reforming reaction temperature and the exotherm caused by the absorption of the carbon dioxide to the carbon dioxide absorbent. After that, the gas is supplied to the upper portion of the reactor 14, and used as a recycle gas in the absorbent regeneration/heat storage step.

When the temperature of a filling layer 14b rises to the regeneration temperature, the regeneration reaction of the carbon dioxide absorbent progresses to the left-hand side of reaction formula 3 presented earlier, so the absorbed carbon dioxide is discharged. However, the velocity of heat flow in the filling layer 14b can be increased by using convection heat transfer by circulating the same material as the gas absorbed by the absorbent. This raises the heat flow velocity and consequently shortens the time required for regeneration. Therefore, it is preferable to perform this carbon dioxide recycle. The recycle amount can be determined such that the temperature after heating by the oxidizing means is 900° C. or less, which has no influence on the carbon dioxide absorbent.

Carbon dioxide is cooled by the cooler 18. However, a cooling means is not restricted to this cooler, and heat collection suited to the purpose can be performed. In particular, the carbon dioxide-containing gas exhausted from the reactor exit has a high temperature, so the sensible heat of this high temperature can be effectively used by various methods. For example, the sensible heat can be used as a heat source for generating the steam 2 shown in FIG. 5. That is, heat collection corresponding to the purpose can be appropriately performed.

In this embodiment, a material introducing means is formed by, e.g., the lines (e.g., 33) from the carbon-containing fuel 1 and steam 2 to the reactor 13 and the devices (e.g., 11). The line 34 is also a material introducing means. Although switching means for switching these means to be used are not shown in FIG. 5, these switching means can be properly formed by valves inserted into the lines. If these valves are automatic valves and a computer or the like is used to control these automatic valves, switching can be performed automatically. Also, a switching timing control means for switching these switching means at different timings can be formed by using automatic valves as these valves and using a computer or the like for controlling these automatic valves.

FIGS. 4A, 4B, and 4C illustrate changes with time when the system shown in FIG. 5 is operated. A gas generated upon switching and remaining in each of the reactor 12, 13, and 14 can be exhausted to the outside of the system by appropriately purging the reactor as needed, or can be mixed in the reformed fuel as a product or in the carbon dioxide-containing gas as a by-product. Although the product purity deteriorates in this case, the product can still be properly effectively used. Each embodiment of the present invention has been described above. However, the present invention is not limited to the method and system using one reactor 212 shown in FIG. 1, and to the methods and systems using the three reactors 12, 13, and 14 shown in FIGS. 3 and 5. That is, the number of reactors can be appropriately determined in accordance with the intended purpose.

In the second and third embodiments, reformed fuel can be continuously obtained by a periodic repetitive operation by using the three independent reactors. However, the three steps can also be performed by forming partitions in one reactor. So, the number of reactors is not physically restricted.

The present invention will be described in more detail below by way of its examples, but the invention is not limited to these examples.

EXAMPLE 1

A reformed gas (reformed fuel) was obtained by the fuel reforming systems shown in FIGS. 3 and 5 by using a city gas containing methane as its main component as carbon-containing fuel. FIG. 6 shows the gas composition, temperature, and the like in each part of these fuel reforming systems. Also, a carbon dioxide-containing gas having a purity of 99.5 mol % was obtained as a by-product.

Comparative Example 1

Figure 7:
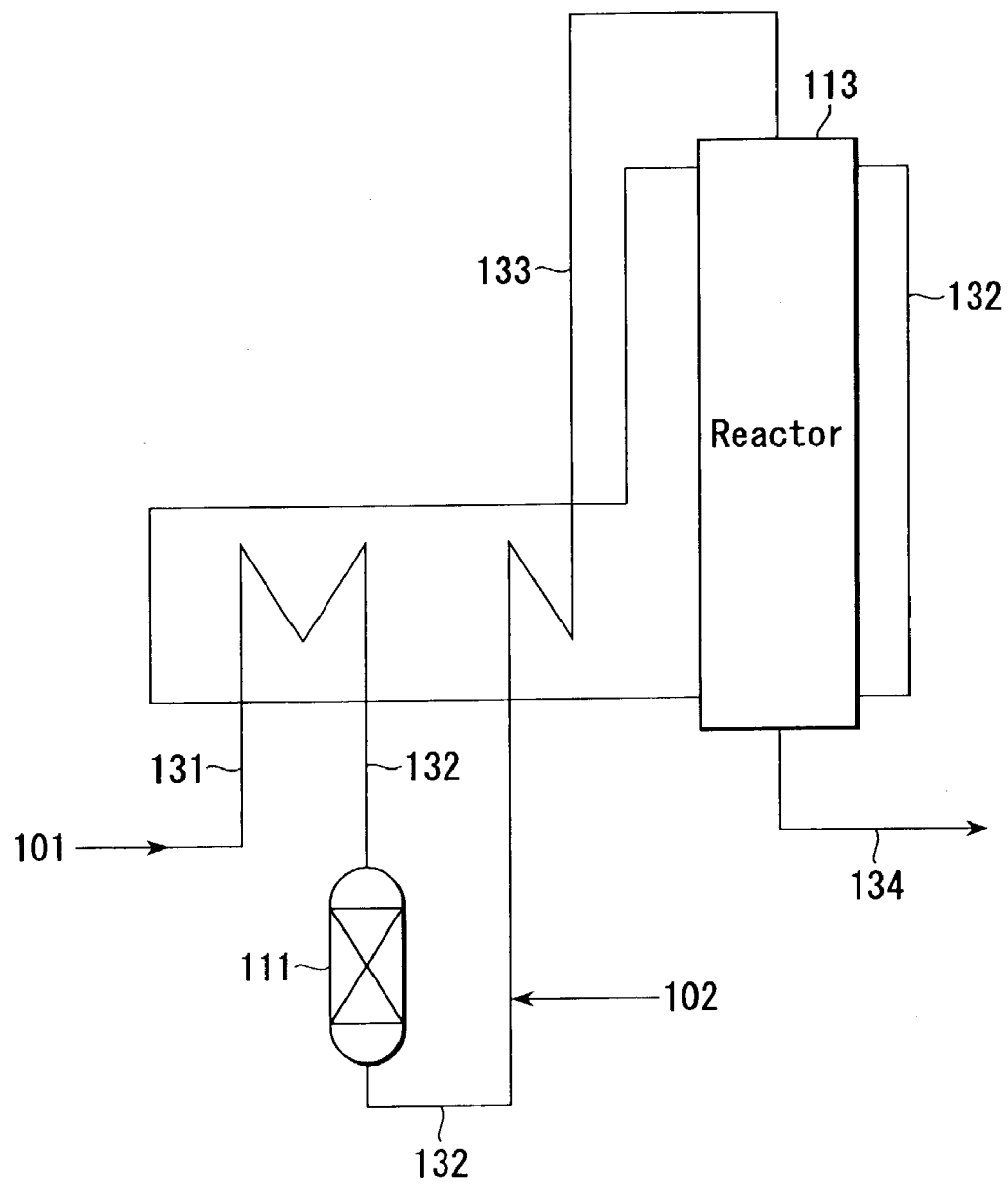
FIG. 7 is a view showing the form of the manufacture of a hydrogen rich gas according to a conventional heating oven type steam reforming method.

A reformed hydrogen rich gas was manufactured by a conventional method (heating oven type steam reforming method) shown in FIG. 7 by using a city gas containing methane as its main component as carbon-containing fuel. To remove sulfur components having adverse effect on the activity of a reforming catalyst, a city gas 101 was supplied through a line 131 and supplied to a desulfurizer 111 through a line 132 heated to about 400° C. The desulfurizer 111 desulfurized the supplied city gas 101. This desulfurized city gas 101 was supplied through a line 132 and mixed with steam 102 such that the same steam/carbon ratio as in Example 1 was obtained. The gas mixture was supplied at 500° C., through a line 133, to a plurality of reactors 113 installed in a heating type steam reforming oven 112. Each reactor 113 was filled with the same amount of the same reforming catalyst as in Example 1. A steam reforming reaction occurred on the catalyst in the reactor 113, and a hydrogen rich gas was produced. This hydrogen rich gas was supplied as a product gas at 600° C. through a line 134. FIG. 6 shows the gas composition, temperature, and the like in each part of Comparative Example 1 according to FIG. 7.

Comparative Example 2

A hydrogen rich gas was manufactured following the same procedure as in Comparative Example 1 except that the temperature of the product gas was 850° C. FIG. 6 shows the gas composition, temperature, and the like in each part of Comparative Example 2.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A fuel reforming system for obtaining reformed hydrogen rich fuel from a carbon-containing fuel and steam, comprising:

first to third reactors, each including a filling layer filled with a fuel reforming catalyst which promotes a fuel reforming reaction by which the carbon-containing fuel and steam react with each other to produce carbon dioxide and hydrogen, and a carbon dioxide absorbent capable of reversibly absorbing and discharging carbon dioxide, in each of which fuel reforming process is performed, the fuel reforming process comprising:

a fuel reforming/carbon dioxide separation step of supplying the carbon-containing fuel and steam to a reactor filled with the filling layer, setting the carbon dioxide absorbent at an absorption temperature, thereby converting the carbon-containing fuel into reformed fuel, and separating carbon dioxide from the reformed fuel by allowing the carbon dioxide absorbent to absorb carbon dioxide, and using absorption heat generated when the carbon dioxide absorbent absorbs carbon dioxide in the reactor as the reaction heat of the fuel reforming reaction;

an absorbent regeneration/heat storage step of obtaining a product gas by oxidizing at least one of a portion of the reformed fuel and the carbon-containing fuel with an oxidizer, and heating, with this product gas, the carbon dioxide absorbent which has absorbed carbon dioxide to a regeneration temperature, thereby regenerating the carbon dioxide absorbent and storing heat in this carbon dioxide absorbent; and a cooling/fuel reforming step of supplying the carbon-containing fuel and steam to the reactor in which the absorbent regeneration/heat storage step is completed, thereby cooling, to the absorption temperature, the carbon dioxide absorbent heated to the regeneration temperature, and converting the carbon-containing fuel into reformed fuel by heat energy stored in the carbon dioxide absorbent, wherein the steps are repeated in this order, and each of the steps is performed in one of the reactors in the same time period, a first thermometer provided in each of the first to third reactors, the first thermometer measuring temperature of the product gas in the absorbent regeneration/heat storage step; and a second thermometer provided in each of the first to third reactors, the second thermometer measuring temperature of the reformed fuel in the cooling/fuel reforming step, wherein:

a completion time of the fuel reforming/carbon dioxide separation step is determined from elapsed time according to a breakthrough curve prepared in advance based on an average temperature of the filling layer and an amount of the carbon dioxide absorbent filled therein;

a completion time of the absorbent regeneration/heat storage step is determined by detecting a boundary between the regeneration temperature at which the carbon dioxide absorbent can discharge carbon dioxide and the absorption temperature at which the carbon dioxide absorbent absorbs carbon dioxide, based on the temperature measured by the first thermometer; and a completion time of the cooling/fuel reforming step is set as a point in time when the temperature measured by the second thermometer reaches an absorption temperature level of the filling layer that is required in the fuel reforming/carbon dioxide separation step.

2. A fuel reforming system according to claim 1, wherein each of the reactors comprises:

a material supplier for supplying the carbon-containing fuel and steam to the reactor;

a heater for obtaining the product gas and heating the carbon dioxide absorbent to the regeneration temperature with this product gas; and a switch for switching the material supplier and heater to be used.

3. A system according to claim 2, further comprising a switching timing controller which, of the switch for the material supplier and heater, shifts the switching timing of at least one switch from the switching timing of at least one of remaining ones of the switch.

4. A system according to claim 1, wherein the reactor is filled with a heat storage material which stores heat energy of the product gas.

5. A system according to claim 1 wherein at least one of a portion of the reformed fuel and the carbon-containing fuel is oxidized with an oxidizer, and the reaction heat of this oxidation reaction is used as the reaction heat of the fuel reforming reaction.

6. A system according to claim 1, further comprising recycling means for recycling carbon dioxide discharged from the carbon dioxide absorbent to a reactor containing the carbon dioxide absorbent which has discharged the carbon dioxide.

7. A system according to claim 6, wherein the heater heats the carbon dioxide absorbent by a gas mixture of the product gas and the recycled carbon dioxide.

8. A system according to claim 6, wherein the heater heats the carbon dioxide absorbent by indirectly heating the recycling means.

9. A system according to claim 1, wherein the carbon dioxide absorbent is one of a compound which produces a carbonate by reacting with carbon dioxide, and a mixture obtained by adding to the compound at least one carbonate selected from the group consisting of a carbonate of an alkaline metal and a carbonate of an alkaline earth metal.

10. A system according to claim 9, wherein the compound which produces a carbonate by reacting with carbon dioxide is at least one lithium composite oxide selected from the group consisting of lithium zirconate, lithium ferrite, and lithium silicate.

* * * * *